April 1, 1952  D. H. REEVES  2,591,292
FLUID VALVE
Filed April 16, 1945  4 Sheets-Sheet 1
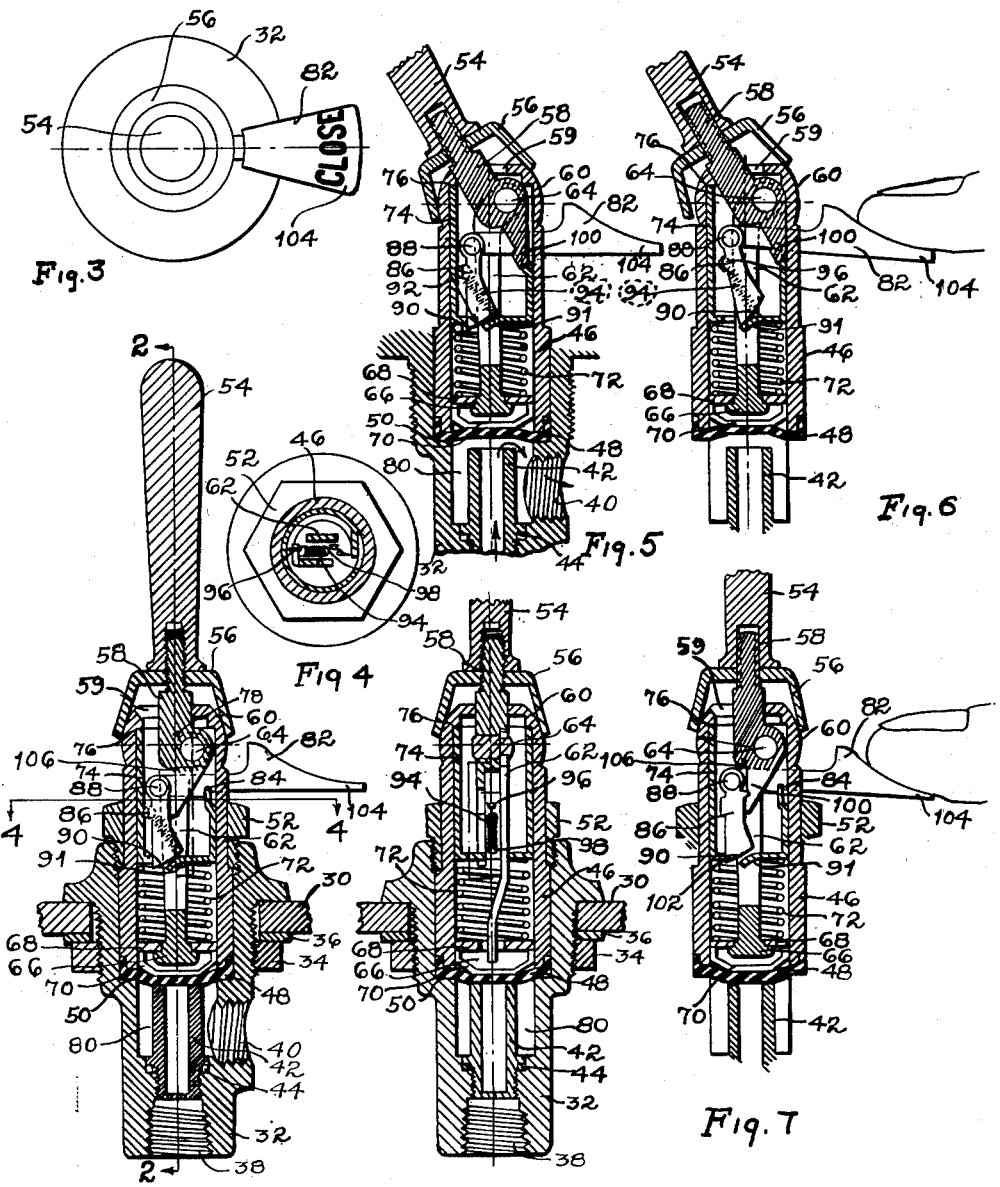
Inventor
Donald H. Reeves
By Henry G. Dybvig
His Attorney April 1, 1952     D. H. REEVES     2,591,292

FLUID VALVE

Filed April 16, 1945     4 Sheets-Sheet 2

Inventor
Donald H. Reeves
By Henry G. Ebling
His Attorney

April 1, 1952 D. H. REEVES 2,591,292
FLUID VALVE
Filed April 16, 1945 4 Sheets-Sheet 3

Inventor
Donald H. Reeves
By Henry G. Dyberg
His Attorney

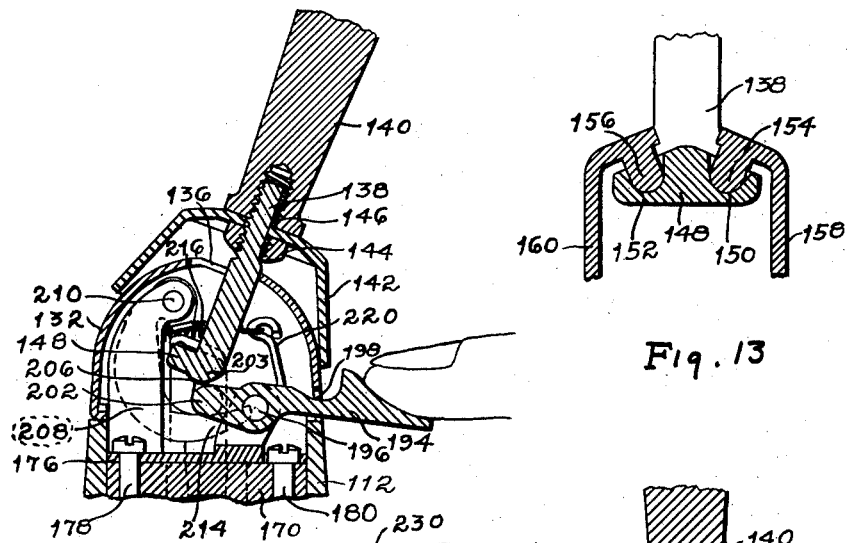
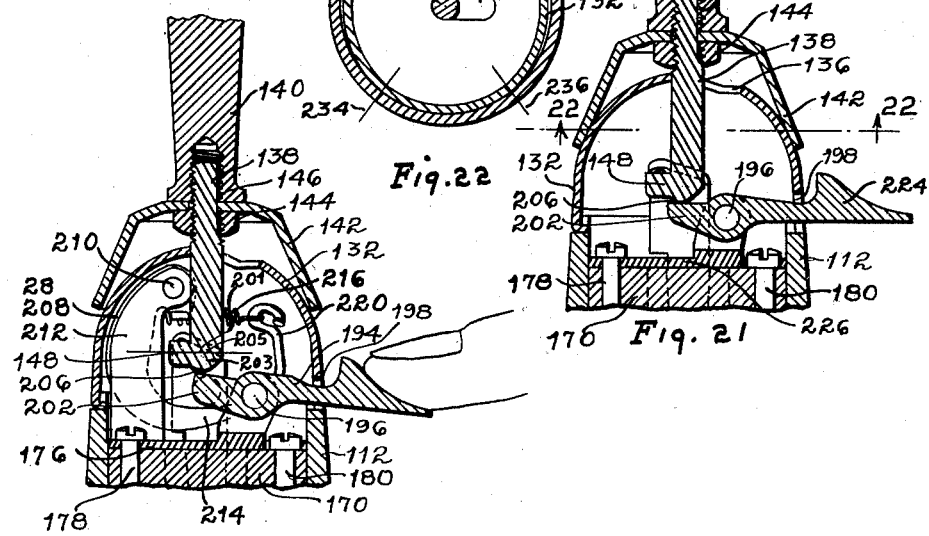

Patented Apr. 1, 1952

2,591,292

UNITED STATES PATENT OFFICE 2,591,292

FLUID VALVE

Donald H. Reeves, Dayton, Ohio, assignor to Donald H. Reeves And Associates, Beulah, Mich., a partnership Application April 16, 1945, Serial No. 588,665

11 Claims. (Cl. 277—20)

This invention relates to fluid valve assemblies or faucets and more particularly to valves or faucets that may be frequently opened and closed.

This invention is related to the inventions disclosed in my copending applications for United States Letters Patent Serial Numbers 508,721 and 509,633 ripening into Patents Nos. 2,497,557 and 2,497,558, respectively, each dated February 14, 1950. This invention has many of the fundamental principles of operation shown in these previous applications with certain added improvements. Some of the embodiments of this invention are disclosed in another application for United States Letters Patent Ser. No. 588,666 filed April 16, 1945.

In the past, valves and faucets, particularly those commonly used in connection with lavatories, bath tubs, showers, sinks, laundry tubs and other such applications where there is no other shut-off means between the outlet of the valve or faucet and the discharge point, have been so made that when manually opened to a desired degree, to which degree it will remain opened until manually closed, there is no assurance that the valve will be completely closed, even though that be the wish of the operator, as it is necessary to manually move the valve to its completely closed position in order to prevent leakage. This requires careful operation whenever closing the valve and hasty or slightly careless operation will general'y result in incomplete closure of the valve or faucet with its resultant leakage. In closing the now commonly used valve or faucet, it is much easier to so operate it that it will leak slightly than it is to operate it so that it will be completely closed. Because most people realize that it is necessary to completely close the valve or faucet in order to prevent its leaking, many people, when closing a valve or faucet, will exert undue force into the operation, thereby greatly reducing the life of the washer that is used to effect the closure.

Whenever both hot and cold water are used, the present common practice is to have a faucet for each, or else to have a valve for each, the outlets of both valves being connected to a common outlet that empties at the desired point. In the many cases when it is necessary to open both of these faucets or valves in order to obtain water at the desired temperature, the manipulation of the control handles of both valves or faucets is necessary both in opening and in closing. In case the water is not at the desired temperature, it is often necessary to manipulate both control handles to open one valve and close the other, in order to get the desired temperature. If, where two valves are connected to a single outlet, they are presumably closed by the independent manipulation of the two handles and it is found that the outlet is dripping, it is not apparent to the operator which of the two valves is leaking, so it is often necessary to try further closing of both valves before the dripping is stopped.

Valves and faucets now in common use are so made that they will remain open to whatever extent the operator leaves them open. While this is in general the most convenient means of operation, there are times when a self-closing faucet would be more convenient, especially if the opening operation were an extremely simple one.

Valves or faucets now in common use have most of their working parts in the water chamber where the corrosive action of the water often makes the valve unusable.

An object of this invention is to improve valve assemblies. More specifically, an object of this invention is to provide valve assemblies so made that when the operator attempts to close the valve or valves, closure will be complete so as to insure no leakage, regardless of how carelessly the closing operation has been performed.

Another object of this invention is to provide valve assemblies wherein excessive pressure cannot be exerted upon the valve seat by the operator, which excessive pressure reduces the life of the seating parts.

Another object of this invention is to provide a valve assembly wherein any desired mixture of hot and cold water can be obtained in any desired quantity by means of a single control handle, with single shut-off means that will insure the complete closing of both the hot and the cold water valves, regardless of how carelessly the closing operation has been performed.

Another object of this invention is to provide a valve or faucet assembly of the type that will remain open to any desired degree but with improved means to make possible the operation of the valve as a self-closing valve, the closing of the valve being accomplished by the most simple pressing of a lever or button.

Another object of this invention is to provide a valve or faucet assembly of such construction that it is unnecessary to grasp the controlling handle or other member in order to either open or close the valve; but where either the opening or closing can be accomplished by merely pushing a controlling member, making it possible to perform the operation with a hand that is already engaged in holding something.

Other objects and advantages reside in the construction of parts, the combination thereof and the mode of operation, as will become more apparent from the following description.

Referring to the drawings, Figure 1 is a vertical cross sectional view of one embodiment of my invention, as applied to a valve assembly containing a single valve, showing the valve in the closed position.

Figure 2 is a vertical cross sectional view of the same embodiment, this view being taken at right angles to that shown in Figure 1, approximately along the line 2—2 in Figure 1. This view shows the valve closed.

Figure 3 is a top view of the same embodiment.

Figure 4 is a horizontal cross sectional view taken approximately along line 4—4 in Figure 1.

Figure 5 is a fragmentary cross sectional view corresponding to Figure 1, but showing the valve open.

Figure 6 is a fragmentary cross sectional view corresponding to Figure 1, but showing the mechanism at the instant that the release lever is pressed in order to close the valve.

Figure 7 is a fragmentary cross sectional view corresponding to Figure 1, showing the mechanism after the handle has returned to its vertical position but before the operator has ceased to press the release lever.

Figure 12 is a horizontal cross sectional view taken approximately along line 12—12 as shown in Figure 8, but with the handle socket removed.

Figure 13 is an enlarged view of a portion of Figure 8.

Figure 19 is a fragmentary vertical cross sectional view corresponding to Figure 18; but showing the mechanism at the instant that the release lever has been pressed in order to close the valves.

Figure 20 is a fragmentary vertical cross sectional view corresponding to Figure 9, showing the mechanism after the handle has returned to its vertical position, but before the operator has ceased to press the release lever.

Figure 21 is a fragmentary vertical cross sectional view of a modification of the second embodiment and corresponds to Figure 9 of the second embodiment, this modification having the same release means as is disclosed in the second embodiment, but omitting the release lever detent.

Figure 22 is a section through the handle socket and the body cap of the second embodiment at the line of their contact, taken substantially on the line 22—22 of Figure 21.

Figure 11:
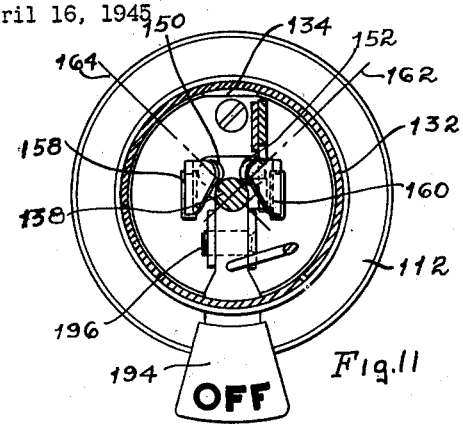
Figure 11 is a horizontal cross sectional view taken approximately along line 11—11 as shown in Figure 9.
Figure 10:
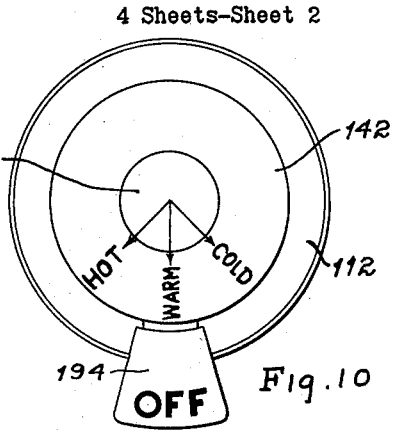
Figure 10 is a top view of this second embodiment, showing the directions of movement of the handle.

In the drawings, the reference character 30 designates a valve support, such as a lavatory, bath tub, sink or the like. This support 30 is provided with an aperture receiving the main body 32 of the valve assembly, which is held in position by suitable retaining means such as the nut-like member 34 seated upon a washer 36.

Body 32 has an inlet connection 38 and an outlet connection 40. The inlet connection 38 opens into an orifice member 42 which is screwed into body 32, so as to clamp a gasket 44 making a leak-tight joint. This orifice member 42 can be made an integral part of body 32 if desired; but the construction shown allows the replacement of the orifice when it becomes unusable due to wear or corrosion. A tubular valve supporting member 46 is concentrically mounted in the valve body 32 and its lower end compresses flexible diaphragm or partition 48 against a shoulder 50 of the body 32. This tubular valve supporting member 46 is held in position by a lock nut 52 which screws into body 32. The diaphragm 48 is made of rubber-like material having characteristics suitable for the fluid employed.

A handle 54 and a handle socket 56 both screw upon a pivot member 58, to provide for vertical adjustment of the working parts, as will now be described. The handle socket 56 bears at its lower edge on the surface of a ball-shaped upper portion 60 of the tubular member 46. Pivot member 58 has a stem with rectangular cross section which passes through a rectangular slot 59 in the top of tubular member 46. This slot prevents the handle from rotating clockwise beyond the vertical position shown in Figure 1. A lifting member 62 pivotally engages the pivot member 58 by means of a stud or pivot 64. The lower end 66 of the lifting member 62 engages a disc 68 in such a way that when lifting member 62 is raised, it will cause the disc 68 to rise, thereby allowing a plunger 70 to rise.

The upper end of a compression spring 72 is held in a fixed position by means of retaining member 74, the upper end of which bears against shoulder 76 of tubular member 46. The lower end of the spring 72 presses downwardly upon disc 68. When the lifting member 62 is in its lowest position, disc 68 is allowed to act freely under the pressure of spring 72 and it therefore presses plunger 70 downwardly, causing the center portion of diaphragm 48 to be pressed against the top of orifice member 42, thereby closing the orifice member so that no fluid can flow. Spring 72 is made with sufficient pressure to cause diaphragm 48 to close the orifice member 42 against the highest pressure and velocity that will be encountered.

The center of the pivot 64 normally lies below and to one side of the center of the upper portion 60, which is a spherical segmental surface, so that as the pivot member 58 is oscillated with the socket 56 in contact with the spherical segmental surface 60, the pivot 64 travels through a curved path concentric with the spherical segmental surface 60.

When the upper end of the handle 54 is moved to the left or rotated counterclockwise, as shown in Figure 5, handle socket 56, bearing against the spherical segmental surface 60 of tubular member 46, causes the handle to rotate about the center 78 of surface 60, causing the stud 64 to rise, which in turn raises lifting member 62 and disc 68, leaving plunger 70 and the center portion of flexible diaphragm 48 free to rise under the pressure of the fluid in orifice member 42, thus allowing the fluid to flow out of the top of orifice member 42 into chamber 80 of body 32 and thence out of the valve body through outlet 40, approximately as indicated by the arrows in Figure 5. Because of the angle of pressure between the edge of the handle socket 56 and the spherical segmental surface 60, the friction between these two parts is great enough to hold the handle in any position where the operator may leave it. The handle 54 may be moved in either direction to open or close the valve to any desired degree and it will stay where the operator leaves it. The parts thus far described comprise a complete and operable valve assembly.

The conventional valves now in use each have a control handle which can be used for opening and closing the valve. When closing the valve, however, the operator must be very careful to fully close the valve or there will be a slight leakage which, in the case of a liquid, will cause a drip or a small stream to remain running, which is both wasteful and extremely annoying. This is also the case in the valve described above, though to a lesser degree, because the operation of closing the valve is easier than that of opening and because the provision of a little lost motion makes it unnecessary to stop in one exact place in order that the valve may be closed.

To practically eliminate this closing trouble, in the device disclosed herein a release lever 82 is provided. This is pivotally mounted upon an edge of the retaining member 74 at a point 84. Detent 86 is pivotally attached to release lever 82 by means of stud 88. The lower end 90 of detent 86 is arcuate, the center 92 of the arc being offset somewhat from the center of the pivot 88, as shown in Figure 5. This arcuate end 90 normally rests on surface 91 of retainer 74. Tension spring 94 is fastened at one end to detent 86 at point 96 and at the other end to projection 98 of retainer 74 (see figure). With the arcuate surface 90 as shown, any counterclockwise rotation of the detent 86 around pivot 88 will raise pivot 88. Tension spring 98 tends to rotate detent 86 counterclockwise; but it also tends to rotate release lever 82 counterclockwise around its pivot 84, thereby tending to lower pivot 88. Due to the fact that the moment arm tending to rotate detent 86 is quite small in comparison to the moment arm tending to rotate release lever 82, these parts will remain in the positions shown in Figures 1 and 5, even though they be not restrained from moving by any other means.

When the handle 54 is in the vertical position, as shown in Figure 1, projection 100 on pivot member 58 bears against the edge of detent 86, forcing the lower end of the detent against the edge 102 of the opening in retainer 74 through which the end of the detent projects. This insures the proper positioning of the detent 86 and the release lever 82 when the valve is closed. When the handle 54 is moved counterclockwise to open the valve, projection 100 leaves detent 86. If, now, the outer end 104 of release lever 82 is pressed downwardly, as shown in Figure 6, the entire release lever is rotated around pivot 84, raising detent pivot 88 and detent 86. As detent 86 is raised, tension spring 94 causes detent 86 to rotate counterclockwise as far as the arcuate surface 90, in contact with surface 91, will allow it to rotate. Because of the small angle between the arcuate surface 90 and an arc through the pivot center 88, the friction of the arcuate surface on surface 91 is great enough so that pivot 88 and detent 86 will not lower again, regardless of the amount of force that is exerted downwardly on that end of the release lever 82, until detent 86 is forced to rotate clockwise by projection 100 on pivot member 58.

The valve can be closed by manually returning handle 54 to its vertical position. An easier and surer means is to press downwardly end 104 of release lever 82. This action first closes the gap between the top of the release lever and the arcuate surface 106 on pivot member 58, then further movement of the release lever will slightly raise pivot member 58 so that the entire edge of handle socket 56 is no longer in contact with spherical segmental surface 60, although some portion of the edge may still be in contact with the ball. This removes the friction between the socket 56 and the surface 60, so that the downward force of the compression spring 72, acting through lifting member 62, pulls down on pivot 64, causing the handle 54 to return to its vertical position, as shown in Figure 7. Due to the lightness of the parts to be moved and the amount of pressure of the springs, the return of the handle to its vertical position is accomplished so quickly that in the great majority of cases this will occur while the operator is still pressing the release lever, as shown in Figure 7. In order to permit a quicker return to the vertical position, the handle can be made hollow or of light weight materials. A highly satisfactory valve assembly can therefore be made omitting detent 86. There is a remote possibility, however, that the operator will cease pressing the release lever before the handle has completed its return to the vertical position. It is to insure the complete closing of the valve that the detent 86 has been added. As previously explained, this detent 86 holds the pivot 88 at the highest position to which it has been moved by the pressing of the outer end 104 of the release lever 82. If, therefore, the release lever 82 is pressed far enough so that it causes handle socket 56 to disengage from the spherical segmental surface 60, then the release lever will remain in this position, even though the operator has ceased to press the end 104 of the release lever, until projection 100 on handle pivot member 58 forces detent 86 back into its normal position, as shown in Figure 1. While this last action takes place slightly before the handle has completed its travel, the amount is so slight that the inertia of the handle and other moving parts is great enough to insure completion of the movement.

Figures 17, 23:
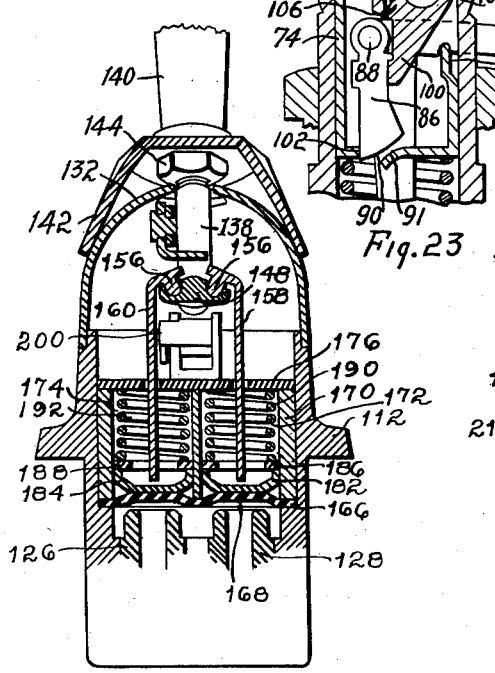
Figure 17 is a vertical cross sectional view corresponding to Figure 8; but with both valves open.
Figure 23 is an enlarged fragmentary cross sectional view of a portion of the valve shown in Figure 7, so as to disclose the offset relation of two centers of gravity.

As previously explained, only the very slightest disengagement of handle socket 56 and the spherical segmental surface 60 is necessary to allow the handle 54 to move freely under the pressure of spring 72. Because the movement of the release lever necessary to cause this disengagement is very slight after the release lever has contacted arcuate surface 106 of pivot member 58, it is possible that if the center 105 of the arc of this arcuate surface 106 coincided with the center of the spherical segmental surface 60, then any slight irregularity in the surface of the spherical segmental surface would cause handle socket 56 to again engage on the spherical segmental surface 60 and would prevent the further movement of the handle 54, making it impossible for the valve to complete its closure. To eliminate the danger of this happening, the center 105 of the arcuate surface 106 is offset slightly from the center 107 of the spherical segmental surface 60 as best seen in Figure 23. Referring to Figure 7, it will be seen that the radii of these two circles are indicated by lines with arrows at the arcs and dots in the centers and it will be seen that the center of the arcuate surface 106 is slightly to the right of the center of the spherical segmental surface 60. This being the case, when the handle 54 is moved to its open position, as shown in Figure 5, the center of the arcuate surface will rise in relation to the center of the spherical segmental surface 60. This being the case, when the release lever 82 is pressed sufficiently to raise the handle socket 56 so it disengages from the spherical segmental surface 60, allowing movement of the handle 54 toward its closed position, handle socket 56 will continuously rise slightly as this movement takes place, thereby increasing the clearance between the handle socket 56 and the spherical segmental surface 60, so that any slight irregularity in the surface of the spherical segmental surface 60 will have no effect on the movement of the handle. If the operator is still pressing the release lever when the handle 54 has returned to vertical position and the release lever has not been allowed to move at all toward its normal position, then the complete handle assembly will be held upward so that handle socket 54 is well out of contact with the spherical segmental surface 60 and it is possible that lifting member 62 will consequently hold disc 68 high enough so that plunger 70 will not force diaphragm 48 tightly against the top of orifice member but as soon as the operator ceases to press the release lever, all of these parts will drop into their normal closed positions and the valve will be tightly closed.

If the end of release lever 82 is pressed downwardly when the handle 54 is in its vertical position, as shown in Figure 7, the entire handle assembly, including handle 54, socket 56 and pivot member 58, will move upwardly. During this upward movement the handle 54 will remain in a vertical position, due to the fact that the stem of the pivot member 58 bears against the front end of slot 59. The handle assembly cannot therefore rotate clockwise and it will not rotate counterclockwise, because of the pressure exerted on pivot 64 by spring 72. As the release lever is pressed and the handle assembly rises, it raises lifting member 62 and disc 68 against the action of compression spring 72, thereby allowing the plunger 70 and the center of the flexible diaphragm 48 to rise, opening the end of orifice member 42 and allowing the fluid to flow. The farther down the end 104 of release lever is pressed, the more the valve will be opened and the greater will be the flow of the fluid. As soon as the operator ceases to press end 104 of the release lever 82, the handle assembly and the lifting member will again drop into the positions shown in Figure 1 and spring 72 will force the diaphragm 48 to close orifice member 42. When so operated, the valve assembly is self-closing in its operation.

In the embodiment shown in Figures 8 to 20 inclusive, the reference character 110 designates a valve support, such as a lavatory, bath tub, sink or the like. This support 110 is provided with an aperture receiving the main body 112 of the valve assembly which is held in position by some means such as clamping member 114 which bears against washer 116 and which is tightly held in position in relation to body 112 by means of screw 118. The body 112 has two fluid inlets which, for the purpose of illustration in this description, we will assume are for hot water and cold water, inlet 120 being for hot water and 122 for cold water. This body 112 also has an outlet connection 124 which, in this case, is shown as a threaded connection to be connected to a separate nozzle at some other place. It is to be understood, however, that this body can be so changed that the outlet connection forms a nozzle, making this valve assembly into a faucet. Each of the inlet connections has screwed into it an orifice member, these being 126 for the hot water and 128 for the cold water, while gaskets 130 between these orifice members and the body form leak-tight connections. These orifice members are shown as removable pieces, so that they can be replaced in case of wear, but they can be made integral parts of body 112, if desired.

Mounted on the upper part of body 112 is the semi-spherical cap 132 having a tongue 134 which projects into a slot in body 112, so that the cap cannot turn in relation to the body. Through an aperture 136 in cap 132, as best shown in Figure 12, projects handle pivot member 138, on which are carried control handle 140, handle socket 142 and lock nut 144, the lock nut and the threaded handle permitting of adjustment of the parts. The pivot member 138 has a flattened section 146 which goes through a hole of like shape in socket 142, so that the socket will not turn in relation to the pivot member. The lower edge of socket 142 rests on the spherical surface of cap 132.

At the lower end of pivot member 138 is a projection 148, the shape of which is best shown in the enlarged view in Figure 13. This projection 148 has two depressions 150 and 152 which have spherical bottoms and tapered sides in which rest the spherically ended projections 154 and 156 of lifting members 158 and 160 respectively. Referring to Figure 11, it will be seen that the depression 150 is diagonally above and to the left of the center of the main portion of the pivot member 138, while depression 152 is diagonally above and to the right of said center, so that lines passed through the centers of these depressions and the center of the pivot member, such as lines 162 and 164, are at approximately right angles to each other.

Figure 8:
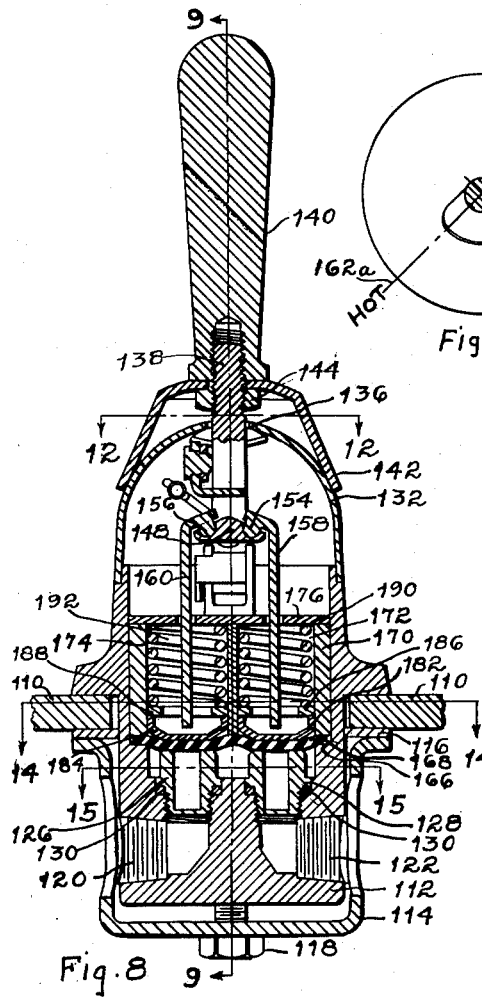
Figure 8 is a vertical cross sectional view of a second embodiment of my invention, as applied to a valve assembly containing two valves and showing both valves in their closed positions, this view being taken approximately along line 8—8 in Figure 9.
Figure 14:
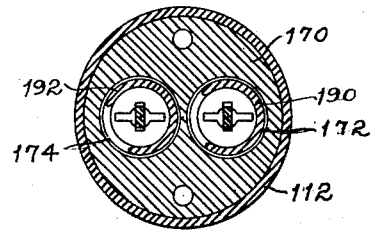
Figure 14 is a horizontal cross sectional view taken approximately along the line 14—14 as shown in Figure 8.
Figure 15:
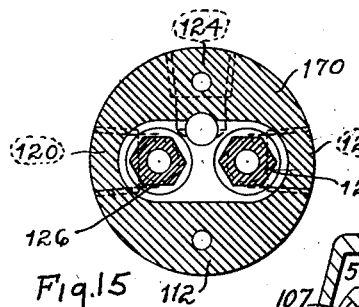
Figure 15 is a horizontal cross sectional view taken approximately along the line 15—15 as shown in Figure 8.

Resting on shoulder 166 of body 112 is flexible diaphragm 168, above which, and clamping the edges of the diaphragm in place, is cylindrical housing 170 through which are two cylindrical holes 172 and 174, best shown in Figure 14. Above housing 170 is retainer 176. Two screws 179 and 180, which screw into body 112, clamp diaphragm 168, housing 170 and retainer 176 together. For purposes of simplification of assembly, screw 180 does not go through retainer 176. In the two holes 172 and 174 in housing 170 and immediately above diaphragm 168 are two plungers 182 and 184 and resting on these plungers are discs 186 and 188. Compressed between discs 186 and 188 and retainer 176 are springs 190 and 192. Lifting members 158 and 160 engage discs 186 and 188 respectively in such manner that the raising of either lifting members will cause the corresponding disc to rise, further compressing the spring above it and leaving the plunger and the portion of the diaphragm directly below it free to rise, which they will do, due to the pressure of the fluid in the orifice member directly below the released portion of the diaphragm. When the lifting members 158 and 160 are not lifted from their normal positions, as shown in Figure 8, discs 186 and 188 are free to force plungers 182 and 184 downwardly, a little clearance being allowed for this purpose, and they, in turn, force downwardly the portions of the flexible diaphragm 168 immediately below said plungers, thereby sealing the ends of the orifice members 126 and 128 and preventing the flow of the fluid. Thus it will be understood that the flow of the fluid through either inlet can be controlled by the raising and lowering of lifting members 158 and 160.

Figure 16:
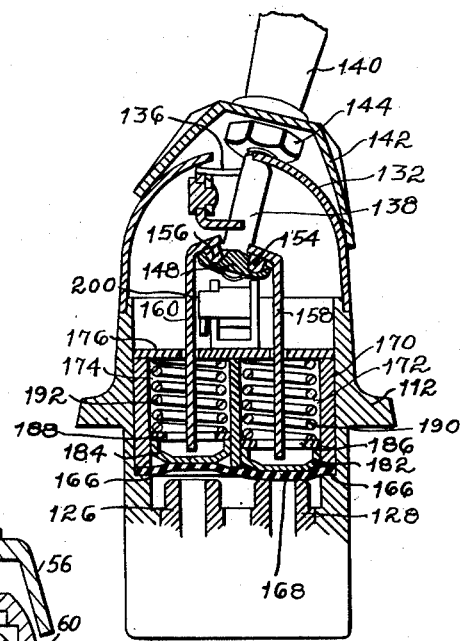
Figure 16 is a vertical cross sectional view corresponding to Figure 8; but with one valve open.

Control handle 140, which is fastened rigidly to pivot member 138 and socket 142, is restricted in its movement by the shape of the aperture 136 in cap 132, through which the stem of pivot member 138 projects. The handle 140 can be moved from its central or vertical position along line 162a, as shown in Figure 12, or along line 164a or anywhere between these two lines, as permitted by the aperture 136. When moved in any of these directions, the handle assembly, which includes handle 140, pivot member 138, socket 142 and lock nut 144, will rotate about the center of the spherical portion of the cap 132, since the edge of the socket 142 is resting on the spherical end of said cap. If, therefore, the handle 140 is moved from its vertical position along line 162a, as shown in Figure 12, depression 152 in projection 148 at the lower end of pivot member 138 will be caused to rise, as it is on line 162, as shown in Figure 11, and line 162 is in the same vertical plane as line 162a. During this movement, depression 150, being on line 164, which is at right angles to line 162, will neither rise nor fall. The result of this movement of handle 140 is therefore to raise lifting member 160 but not move lifting member 158, as is best shown in Figure 16. This raising of lifting member 160 raises disc 188 which allows plunger 184 and the portion of diaphragm 186 immediately below it to rise, opening orifice member 126 and allowing the fluid to flow, which in this case is hot water, while orifice 128 remains closed. Therefore, hot water only will flow from outlet 124. If, on the other hand, the handle 140 is moved along line 164a, depression 150 will rise, raising lifting member 158 and opening orifice 128, while orifice 126 remains closed, so only cold water will flow. If, however, the handle 140 is moved along a line half way between lines 162a and 164a, then both depressions 150 and 152 will be raised an equal amount, though not to as great an extent for a given amount of handle movement as when moved along lines 162a or 164a, so both orifices will be opened an equal amount, as shown in Figure 17, and a mixture of equal parts of hot and cold water will result. If the handle 140 is moved in a direction from center that is on neither line 162a nor 164a, but is nearer to 162a than to 164a, then both orifices will be opened, but orifice 126 will be opened more than orifice 128, so the resultant mixture of the two waters will contain more hot water than cold water. Thus it will be seen that either all hot water or all cold water, or any desired mixture of the two can be obtained, depending entirely upon the direction in which the handle is moved from its vertical position, while the amount of water obtained depends upon the distance from the vertical position that the handle is moved. Obviously, if water is flowing and it is desired to change the proportions of the mixture, it is only necessary to move the handle 140 toward line 162a to obtain hotter water and toward line 164a to obtain colder water. With aperture 136, which limits the amount of movement of the handle, shaped as shown, it is impossible to open both orifices at the same time to their fullest extent, but an approximately uniform maximum flow will result, regardless of the mixture. By slightly changing the shape of aperture 136 so as to allow greater travel of the handle when moved in other directions than along lines 162a or 164a, the full effective openings of the two orifices can be obtained.

When the handle 140 has been moved away from its vertical position, one or both of the compression springs 190 and 192 are compressed and therefore tend to pull the handle back to its vertical position. This is prevented, however, by the friction of handle socket 142 against the surface of cap 132, the angle of contact being such that the friction is greater than the rotating force created on the handle by the springs. Thus, the handle will remain wherever the operator leaves it until the operator purposely causes it to move, either to change the proportions of mixture or the quantity of the water or to shut it off completely. In case either or both of the orifices 126 and 128 are open, they can both be closed in one operation by moving handle 140 to its vertical position, which is as far away from its open position as aperture 136 will allow the handle to move. This is a simple and easy operation and a fairly satisfactory valve assembly need contain no more parts than described above. However, there is no assurance that the valve will be completely closed, as a careless operation can easily result in the handle not being moved its full distance. Additional means have therefore been added to simplify the closing of the orifices and to insure their complete closure.

Figure 9:
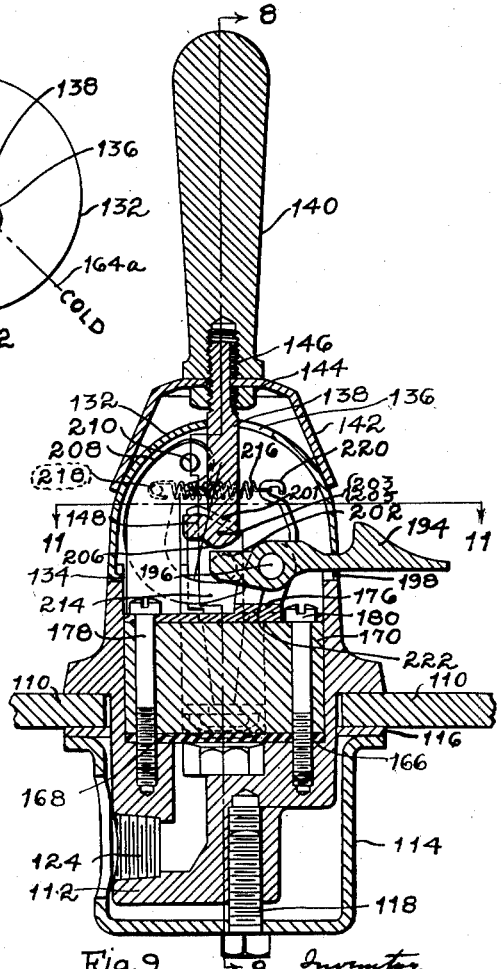
Figure 9 is a vertical cross sectional view of the second embodiment of my invention, this view being taken approximately along line 9—9 as shown in Figure 8 and being at right angles to the view shown in Figure 8.

Release lever 194 is pivoted to retainer 176 by pin 196. This release lever 194 projects through an aperture 198 formed by aligning slots in the top of body 112 and the lower edge of cap 132. When this release lever is not being pressed by the operator, it contacts the top of this aperture, as shown in Figure 9. End 202 extends under the partially spherical end 206 of pivot member 138; but normally these parts do not touch each other. If, when the handle 140 is in other than its vertical position, so that one or both of the orifices are open, the operator presses release lever 194, as shown in Figure 19, end 202 will rise until it touches the partially spherical bottom 206 of pivot member 138 and further pressing of the release lever 194 will cause the entire handle assembly to rise so that the lower edge of socket 142 will clear the spherical surface of cap 132, thereby removing the friction between these two parts, so that the handle assembly is free to move under the action of the compression springs 190 and 192 into its vertical position, as shown in Figure 20. Figures 19 and 20 show the handle assembly raised to such an extent that there is a considerable gap between the lower edge of socket 142 and the surface of the cap 132, actually only the very slightest clearance is necessary to remove the friction between these parts. Due to the lightness of the parts to be moved and the amount of the pressure of the springs, the handle assembly will be returned to its vertical position in so short an interval of time that it is probable that the operator will still be pressing the release lever, as shown in Figure 20. If so, there is a possibility that one or both of the orifices will still be slightly open, but as soon as the operator ceases pressing the release lever, both of the orifices will close tightly. It is very probable that the operator will still be pressing the release lever when the handle has returned to its vertical position, so that in the great majority of cases the valves will completely close. A valve assembly with the above described parts will therefore be highly satisfactory.

There is a possibility that the operator may let go of the release lever so quickly that the handle will not have had time to complete its return, in which case the orifices may be left partially open. To prevent this possibility, detaining means are added. Detent 208 is pivoted by the stud 210 to the arm 212 which is a part of the retainer 176. This detent 208 has a projection 214 which extends across the stem of the pivot member 138. A tension spring 216 extends between a stud 218 on the detent 208 and the arm 220, which is a part of the release lever 194, thus tending to rotate the release lever 194 counterclockwise around its pivot 196 while tending to rotate the detent 208 counterclockwise around its pivot 210. Due to the fact, however, that the lower end of the detent 208 projects under and comes in contact with projection 200 on the end 202 of the release lever 194, neither the detent 208 nor the release lever can move in the direction that the spring tends to move it without the other of these two pieces being moved contrary to the spring tendency. The surface 222 of detent 208 that contacts the projection 200 on release lever 194 is an arc whose center is offset from the center of the detent pivot 210, as shown in Figure 9, to such an extent that it becomes a camming surface. The amount of the offset of this center, however, is so slight that the pressure downward of projection 202 cannot cause the detent 208 to move because of the friction between surface 222 and projection 200. While the camming surface 222 tends to move projection 200 upwardly, the moment arm of the spring 216 on the detent 208 is so small and the moment arm of the same spring on the release lever 194 is so great that the detent 208 cannot cause the release lever 194 to move. Consequently, neither the detent nor the release lever will move, due solely to the influence of the other. If, however, the release lever 194 is pressed downwardly by the operator, when the handle 140 is out of its vertical position, so that pivot member 146 does not contact projection 214 on detent 208, as is shown in Figure 19, then spring 216 will cause the detent 208 to move counterclockwise around its pivot 210, so that surface 222 will stay in contact with projection 202. Thus, if release lever 194 is pressed far enough to release the contact between socket 142 and cap 132, detent 208 will hold the release lever in this position, even though the operator ceases to press the release lever, until handle 140 travels far enough toward its vertical position so that pivot member 146 strikes projection 214 on detent 208 and causes it to return to the position shown in Figure 9. Even though pivot member 146 moves detent 208 before the handle has completed its movement to its vertical position, the remaining movement necessary for the handle is so small that the inertia of the handle insures completion of this handle movement. Complete closure of both orifices is therefore assured every time that the release lever 194 is pressed by the operator far enough to cause any movement of the handle.

Since only the slightest disengagement of handle socket 142 and spherical cap 132 is necessary in order to allow the handle 140 to move freely under the pressure of springs 190 and 192, only a very slight movement of the release lever 194 is required, after surface 202 has contacted spherical end 206 of pivot member 138, before handle 140 will start to move toward its vertical position. For this reason, even though release lever 194 is held stationary, any slight irregularity in the surface of that portion of the cap 132 where the socket 142 makes contact might cause the handle 140 to again cease its movement, preventing the complete closure of the orifices. To prevent this possibility, the center 201 of the spherical end 206 of the pivot member 138 is offset from the center 203 of the spherical end of the cap 132, as will be seen by reference to Figure 9. To assist in the explanation, we will use the number 205 to designate the center of a sphere having the same radius as has the spherical end of cap 132, it being assumed that said sphere is at all times as high in socket 142 as the walls of said socket will allow it to go. This being the case, whenever socket 142 is in full contact with cap 132, centers 203 and 205 must coincide, as is the case in Figures 9 and 18.

Figure 18:
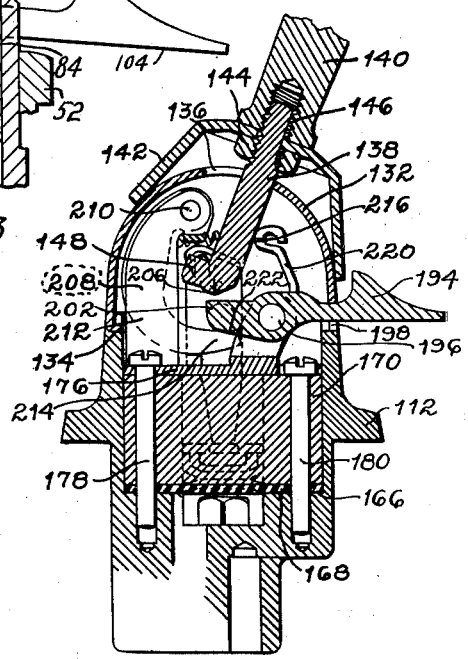
Figure 18 is a vertical cross sectional view corresponding to Figure 9; but with both valves open.

With center 201 offset from centers 203 and 205, when the handle 140 is so moved as to open either or both of the orifices, center 201 of the pivot member 138 rises slightly in relation to the center 203 of the cap, as shown in Figure 18. Since socket 142 is still in contact with cap 132, center 205 still coincides with center 203. If the release lever 194 is now pressed so as to cause spherical end 206 of pivot member 138 to rise, as shown in Figure 19, and if the release lever is held in this position, then center 205 will have left center 203 and as handle 140 moves toward its vertical position, the distance between these centers increases, so the clearance between socket 142 and cap 132 increases, until, when the handle 140 is in its vertical position, center 205 is on the same horizontal line as center 201, as shown in Figure 20. This increasing clearance removes any possibility that a slight irregularity in the surface of cap 132 will stop the movement of handle 140.

As previously explained, the closing of the orifices on both of the previously described modifications of my invention is so rapid that, with the natural movement of the vast majority of operators in pressing the release levers, complete closure of the orifices would result, even though the detents that hold the release levers in their releasing positions were omitted. This omission of the detents and the resultant simplification of the release levers would, of course, simplify the design and construction of the valve assemblies and therefore reduce the cost. Figure 21 shows how this modification of the second embodiment might appear, this figure showing the handle in its central position, so that both orifices are closed. All of the lower parts of the valve not shown in this fragmentary cross section are the same as in Figures 8 to 20 inclusive, as are also those parts that bear the same numbers. The only parts in Figure 21 that are different from those in Figures 8 to 20 inclusive are the release lever 224 and retainer 226. The release lever 224 does not have the projection 202 found in release lever 194 and does not have any connection for a spring, such as arm 220. Also, this release lever 224 is so made and mounted that it will make contact with spherically shaped end 206 of the pivot member 138 at all times if the valve is mounted vertically, as shown, in which case, there is clearance in aperture 198 above the release lever to make sure that the release lever will not prevent the handle from lowering far enough to completely close both orifices. Retainer 226 is similar to retainer 176, but does not have the upright upon which the detent is mounted. Due to the fact that the end of the release lever 224 is always in contact with the lower end of pivot member 138, less movement of the release lever 224 is required for causing the orifices to close than is the case in the embodiment shown in Figures 8 to 20 inclusive. All operations of opening and closing the orifices are the same as described for the embodiment shown in Figures 8 to 20 inclusive, provided the operator continues to press the release lever until the handle has attained its upright position.

In the foregoing description of all embodiments of my invention, I have specified that the members between which friction occurs so that the valve mechanism shall be held open to any desired degree, shall be a coup-shaped member bearing on the outside of a spherical member, these being represented by handle socket 56 and spherical segmental surface or ball 60 in the first embodiment, and handle socket 132 and cap 142 in the second and third embodiments. While these parts will work satisfactorily as described if the handle socket is perfectly round at the line where it touches the spherical surface and if the spherical surface is perfectly true, it has been found that slight inaccuracies in either part may cause the handle socket to bear upon the spherical surface close to the center of rotation of the handle assembly, where the movement of the handle socket on the spherical surface is the least, and not touch at the points where the travel is the greatest, thereby impairing the holding function of these two parts. To overcome this possibility, it has been found advisable to so make these parts that clearance will be assured where the movement between the parts is the least, thereby assuring contact where the movement is the greatest. One means of accomplishing this is shown in Figure 22, which is a section taken through the handle socket 142 and the cap 132 at their line of contact, in which socket 142 is shown as being round, but cap 132 is not truly spherical. The portions of cap 132 from line 230 to line 232 and from line 234 to 236 are spherical in relation to each other and to the center of the movement of the handle assembly; but the portions of cap 132 from line 230 to line 234 and from line 232 to line 236 are so formed that there will be clearance between socket 142 and cap 132 at these points, the cap being located on the valve assembly so that the direction of movement of the handle is approximately between lines 234 and 236. Thus, the greatest movement of the socket in relation to the cap will be somewhere between the approximate positions indicated by lines 230 and 232 at the back of the cap and between lines 234 and 236 at the front of the cap, insuring proper friction action between these parts.

While the foregoing description and the drawings to which it refers are all based on valve assemblies having outlets that are to be connected to spouts that are not integral with the valve assemblies, it is obvious that the description is otherwise equally applicable to faucets wherein the spouts are made as integral parts of the bodies.

For simplification and increased clearness in the description, each embodiment is illustrated and described as having a handle that is in a vertical position when the valves are closed. There is nothing in the construction of the various valve assemblies, however, to prevent proper operation regardless of the direction in which these valve assemblies are mounted.

Although certain preferred embodiments of this device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fluid valve assembly, the combination including self-closing valve means, operating means for allowing said valve means to open to any desired degree within the operative range of the valve assembly, means for holding the operating means in such position as to allow the valve means to remain open, second operating means for releasing the holding means so that the valve will be closed, means for holding the releasing means in releasing position until the closure of the valve means, and means for disengaging the releasing means upon the closure of the valve means.

2. In a fluid valve assembly with two ports, the combination including valve mechanism having self-closing valve means for each port, a single control member operating the valve mechanism so as to allow the opening of the valve means to any desired degree within the operative range of the valve assembly, means for holding the valve mechanism in such position as to allow the valve means to remain open, and separate control means for releasing the holding means.

3. In a fluid valve assembly with two ports, the combination including valve mechanism having self-closing valve means for each port, control means operating the valve mechanism so as to allow the opening of the valve means to any desired degree within the operative range of the valve assembly, means for holding the valve mechanism in such position as to allow the valve means to remain open, and a single control member separate from the first control means for releasing the holding means so that all valve means will close.

4. In a fluid valve assembly with two ports, the combination including valve mechanism having self-closing valve means for each port, control means operating the valve mechanism so as to allow the opening of the valve means to any desired degree within the operative range of the valve assembly, means for holding the valve mechanism in such position as to allow the valve means to remain open, a single control member separate from the first control means for releasing the holding means, and means for holding the releasing means in released position for a sufficient period of time so that the valve means will completely close.

5. In a fluid valve assembly with two ports, the combination including valve mechanism having self-closing valve means for each port, control means for operating the valve mechanism so as to allow the opening of the valve means to any desired degree within the operative range of the valve assembly, means for holding the valve mechanism in such position as to allow the valve means to remain open, a single control member separate from the first control means for releasing the holding means, means for holding the releasing means in released position for a sufficient period of time so that the valve means will completely close, and means for making the last holding means ineffective when the valve means have returned to closed position.

6. In a fluid valve assembly with two ports, the combination including valve mechanism having self-closing valve means for each port, control means operating the valve mechanism so as to allow the opening of the valve means for each port to any desired degree within the operative range of the valve assembly regardless of the amount of opening of the valve means for the other port, means for holding the valve mechanism in such position as to allow the valve means of both ports to remain open, and a single control member separate from the first control means for releasing the holding means so that all open valve means will close.

7. In a fluid valve assembly with two ports, the combination including valve mechanism having self-closing valve means for each port, a single control member operating the valve mechanism so as to allow the opening of the valve means for each port to any desired degree within the operative range of the valve assembly regardless of the amount of opening of the valve means for the other port, means for holding the valve mechanism in such position as to allow the valve means of both ports to remain open, and a single control member separate from the first control member for releasing the holding means so that all open valve means will close.

8. In a fluid valve assembly, the combination including self-closing valve means, control means for allowing said valve means to open to any desired degree within the operative range of the valve assembly, friction means including a movable member and a stationary member for holding the control means in such position as to allow the valve to remain open to any desired degree, and means for separating said movable and said stationary members so as to release said friction holding means, said separating means being so formed that the distance of separation between said movable and said stationary members increases as the valve means approaches the closed position.

9. In a fluid valve assembly, the combination including valve mechanism having self-closing valve means, an operating handle for moving the valve mechanism so as to allow the valve means to open, means having an operative and an inoperative position, said last means holding the valve mechanism in such position as to allow the valve to remain open when in the operative position, and single control means for actuating the holding means from the operative to the inoperative position to permit the valve mechanism to automatically move into closed position.

10. In a fluid valve assembly, the combination including valve means including a diaphragm, control means for allowing the valve means to open to any desired degree within the operative range of the valve assembly when moved from the home position, said control means being movable into home position at the will of the operator, means for holding the control means in such position as to allow the valve means to remain open to any desired degree, and control means separate from the first single control means for converting the first control means into means for automatically closing the valve.

11. In a fluid valve assembly, self-closing valve means, means for opening said valve means, friction means including a movable member and a stationary member for holding said valve means open to any desired degree within the operative range of the valve assembly, and means for separating said movable and said stationary members so as to release said friction means and allow said valve means to close, said movable and said stationary members being so formed that the distance of separation between them increases as the valve means approaches the closed position.

DONALD H. REEVES.

REFERENCES CITED

The following references are of record in the file of this patent:

UNITED STATES PATENTS

| Number | Name | Date |
|---|---|---|
| 602,737 | Farrell | Apr. 19, 1898 |
| 954,898 | Stenberg | Apr. 12, 1910 |
| 963,019 | Bice | June 28, 1910 |
| 1,329,209 | Riccio | Jan. 27, 1920 |
| 1,574,767 | Thurtell | Mar. 2, 1926 |
| 1,584,895 | Rowe | May 18, 1926 |
| 2,153,029 | Tarris | Apr. 4, 1939 |
| 2,205,684 | Cochran | June 25, 1940 |
| 2,211,167 | Safford | Aug. 13, 1940 |
| 2,264,655 | Brackmann | Dec. 2, 1941 |
| 2,308,347 | Asselin | Jan. 12, 1943 |
| 2,308,944 | Turco | Jan. 19, 1943 |

FOREIGN PATENTS

| Number | Country | Date |
|---|---|---|
| 336,912 | Italy | of 1936 |